Patented Aug. 30, 1932

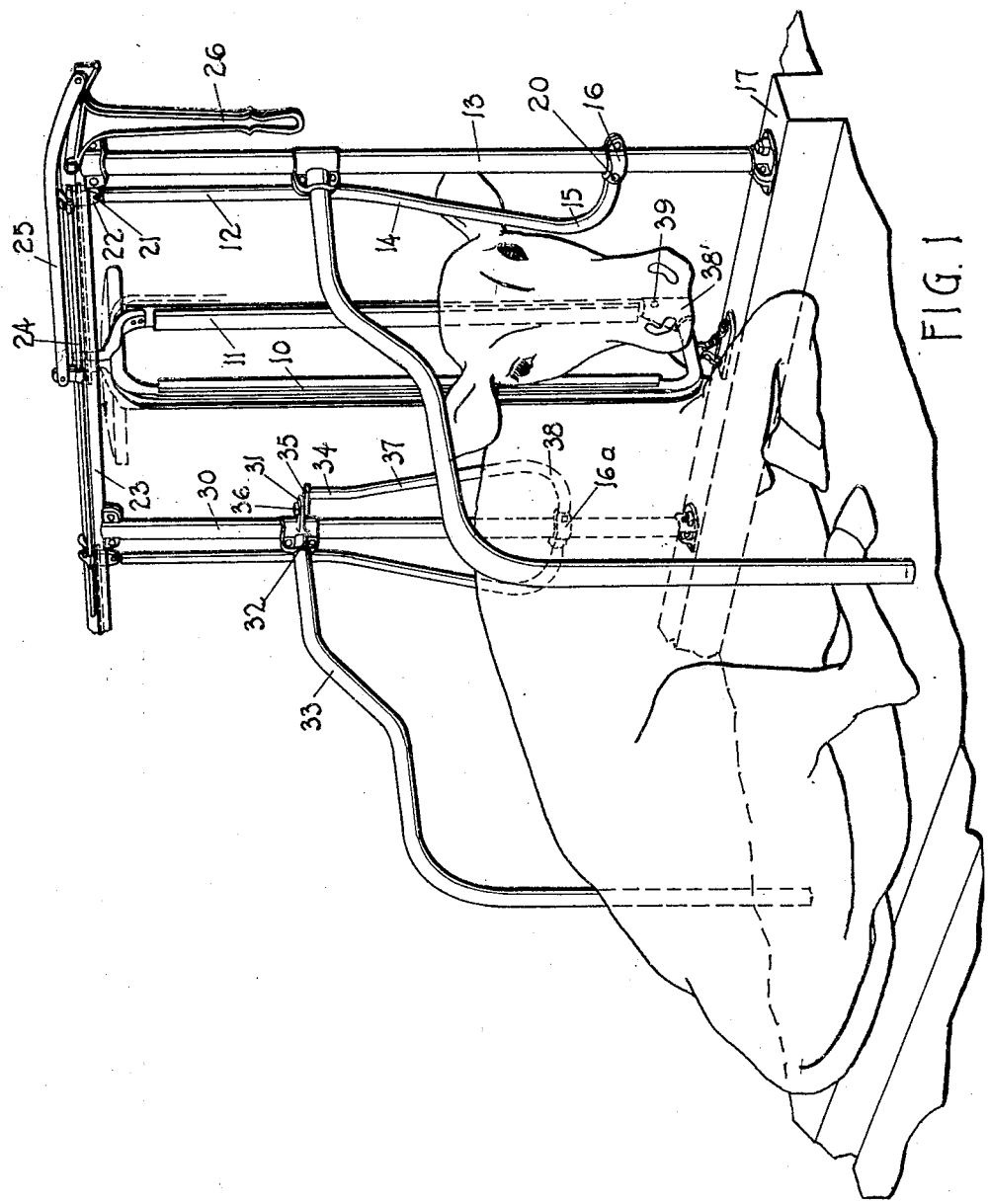

1,874,599

UNITED STATES PATENT OFFICE

JOHN B. OLSON, OF FORT ATKINSON, WISCONSIN, ASSIGNOR TO JAMES MANUFACTURING COMPANY, OF FORT ATKINSON, WISCONSIN, A CORPORATION OF WISCONSIN

STOP GUARD FOR STANCHION FRAMES

Application filed November 17, 1930. Serial No. 496,105.

This invention relates to improvements in stop guards for stanchion frames, and has for its object the provision of stop guards which will not interfere with the comfort of the animal nor tend to promote injuries, regard being also had for economy in construction, durability, and serviceability.

Stop guards are applied to stanchion frames for the purpose of preventing cows entering the stalls from inserting their heads between the stanchions and the supporting posts of the stanchion frame. As heretofore constructed, fixed members have invariably interfered more or less with the comfort of the cows occupying stalls so equipped, but this has been regarded as a necessary evil for the reason that when no guards are employed, it is difficult to compel a cow to back up and take her proper position after she has once obtained access to the manger without projecting her head between the stanchion bars.

Stanchions are permitted to oscillate in such a manner as to allow a cow to turn her head backwardly to reach her shoulder either while standing or while lying down. It is the natural position for a cow, when reclining, to turn her head back upon her shoulder or upon the upper part of her foreleg, with her nose resting upon her shoulder or leg, or in close proximity thereto, and the improved guards are so designed that they will not interfere with such movements, and will not have the objectionable features of the more expensive folding guards or guard members heretofore in common use for the similar purpose of providing for the comfort of the cow and allowing the attendant to freely perform any necessary duties of inspection, adjusting stanchions, etc.

In the drawing:

Figure I is an isometric view of a portion of a cow stable showing one of the stalls equipped with my invention and also showing a cow in a reclining position therein.

As illustrated in the drawing, the stanchion is of ordinary construction with a main bar 10, supported at top and bottom from the frame to oscillate about a vertical axis, and having its lower portion pivoted to an inclinable bar 11 which swings outwardly from the main bar to admit the head of the animal. A guard bar having a vertical upper portion 12, normally substantially parallel to, and in close proximity to the post 13, has an obliquely disposed lower portion 14 which diverges downwardly and inwardly toward the vertical axis of the stanchion. Its lower end portion 15 is curved outwardly toward the post 13, and is secured thereto by clamping plates 16 at a sufficient distance from the sill or beam 17 to allow the cow to move her nose underneath the portion 15 of the guard when folding her head backwardly in the direction of her shoulder or foreleg. This curved portion 15 and the clamping members 16 are also at a sufficient elevation above the knee of the animal to substantially eliminate all danger of injuries to the cow such as have occurred with guards of ordinary construction which permit standing cows to project their legs through the space between the guard and the post.

The portion 15 may, if desired, be pivoted to the clamping members 16 at 20 and the upper end may be pivoted at 21 to a suitable slide 22 associated with the upper frame bars 23 of the stanchion frame. A slide rod 24 connects the slide 22 with ordinary stanchion opening and closing mechanism, including the link 25 and lever 26.

Inasmuch as the slide rod 24 and all other structural parts of the stanchion operating mechanism and stanchion form no part of the invention herein claimed, they may be assumed to be of any ordinary construction, and further illustration and description is deemed unnecessary.

On the opposite side of the stanchion from that occupied by the above described guard, a permanently fixed guard bar of shorter length may be secured to the post 30. The upper end of this auxiliary guard may be bolted to a bracket 31 connected with clamping members 32 which also connect the side rail 33 to the post. This auxiliary guard bar may have a short vertical portion 34 provided with an arm 35 adapted to be received underneath the bracket 31 and connected thereto by bolt 36. Below the portion 34 of this guard a portion 37 extends downwardly and divergently inwardly from the post 30 and its lower end curves outwardly at 38 and is secured to the post by clamping members 16a similar to the clamping members 16, and located at substantially the same height above the sill 17.

The bar 11 of the stanchion is pivoted at 39 to the elbowed portion 38' of the other bar and its upper end is permitted to swing to an inclined position to open the stanchion. When the stanchion is open this bar will swing obliquely across the space above the bracket 31 and the associated short guard, thus requiring the animal to project her head through the open stanchion in order to obtain access to the manger.

It will be observed that these guards will allow the cow maximum comfort by enabling her to turn her head against her body in standing, and also when lying down, notwithstanding the fact that the guards are permanently attached at their lower ends, and that their lower end portions are permanently in guarding position. The swinging movement of the longer guard is material only in the upper end portion, and being connected with the stanchion adjusting mechanism, it will always be out of the way when the stanchion is closed. It entirely avoids the objections to ordinary guards of the folding type, based upon the fact that they are apt to cause injuries to the animals, and are also relatively expensive as compared with fixed guards, or with those in which a simple pivotally swinging movement is permitted.

With my improved guards the curve of the lower end portions on each side of the stanchion is substantially the same and these portions remain permanently in substantially the same position, notwithstanding the slight movement of the lower end of the longer guard when the upper end is swung in correspondence with the swinging movement of the inclinable stanchion bar. My improved guards also avoid a further objection found in the use of adjustable bars where careless attendants fail to make the proper adjustments when admitting cows to the stalls.

I claim:

In a stanchion frame the combination with a front corner post, of a stop guard having its lower end pivotally secured to the post at a greater height than that of the knee of the animal for which the frame is intended, said guard extending in a wide curve inwardly, upwardly, and along an oblique line outwardly toward the post and having its upper end portion substantially parallel with the post and in close proximity thereto, said guard being arranged for swinging adjustment of its upper end in the space between the post and stanchion.

JOHN B. OLSON.